United States Patent [19]

Bilodeau

[11] Patent Number: 4,945,601
[45] Date of Patent: Aug. 7, 1990

[54] WINDSHIELD WIPER UNIT

[76] Inventor: Andre E. Bilodeau, 13 Meadow Spring Dr., E. Sandwich, Mass. 02537

[21] Appl. No.: 290,755

[22] Filed: Dec. 27, 1988

[51] Int. Cl.[5] .............................................. B60S 1/04
[52] U.S. Cl. ............................... 15/250.24; 15/250.19; 15/250.29
[58] Field of Search ........... 15/250.24, 250.19, 250.15, 15/250.28, 250.29

[56] References Cited

U.S. PATENT DOCUMENTS

| | | | |
|---|---|---|---|
| 579,108 | 3/1997 | Ezekiel et al. | 15/250.24 |
| 600,609 | 3/1898 | Brombacker | 15/250.19 |
| 639,956 | 12/1899 | Wernicke | 15/250.19 |
| 939,248 | 11/1909 | Hadka | 15/250.15 |
| 940,135 | 11/1909 | Edman | 15/250.15 |
| 1,054,053 | 2/1913 | Talbot et al. | 15/250.19 |
| 1,156,522 | 10/1915 | Clay | 15/250.15 |
| 1,203,182 | 10/1916 | Cain | 15/250.19 |
| 1,231,973 | 7/1917 | Van Gliesen | 15/250.24 |
| 1,249,683 | 12/1911 | Snudden | 15/250.24 |
| 1,274,445 | 8/1918 | Randall | 15/250.24 |
| 1,304,736 | 5/1919 | Browning | 15/250.24 |
| 1,423,239 | 7/1922 | Meconi | 15/250.24 |
| 1,672,136 | 6/1928 | Scott | 15/250.24 |
| 1,859,641 | 3/1932 | Weaver | 15/250.19 |
| 1,903,439 | 4/1933 | Cain | 15/250.24 X |
| 2,648,087 | 8/1953 | Kiker, Jr. | 15/250.24 X |
| 2,944,276 | 7/1960 | Presser | 15/250.2 X |
| 3,354,494 | 11/1967 | Rischman | 15/250.24 |
| 4,345,352 | 8/1982 | Terabayashi | 15/250.19 X |
| 4,813,095 | 3/1989 | Sato | 15/250.24 X |

FOREIGN PATENT DOCUMENTS

| | | | |
|---|---|---|---|
| 2203269 | 5/1979 | Japan | 15/250.24 |
| 285164 | 2/1928 | United Kingdom | 15/250.24 |
| 281647 | 1/1929 | United Kingdom | 15/250.19 |

Primary Examiner—Harvey C. Hornsby
Assistant Examiner—K. O'Leary
Attorney, Agent, or Firm—John P. McGonagle

[57] ABSTRACT

A windshield wiper system which vertically wipes the entire front windshield of an automobile during both up and down wiping strokes. The system has left and right wiper assemblies horizontally positioned and attached to left and right runner assemblies slidably attached to vertical runner tracks. Driving cables synchronously move the runner assemblies vertically up and down thereby causing the horizontal wiper assemblies to vertically move up and down. The wiper assemblies overlap and thereby establish a continuous horizontal wiping zone across the windwhield. The separate and overlapping wiper assemblies permit a lengthening and contracting of the wiping zone without interference between wiper assemblies. A tensioning cable applied across the wiper assemblies permits adjustment to changing windshield contours without losing contact with the windshield.

2 Claims, 8 Drawing Sheets

WINDSHIELD WIPER UNIT

BACKGROUND OF THE INVENTION

This invention relates to windshield wipers, and more particularly to an automobile wiper system which cleans the entire windshield while dynamically adjusting to the area and curvature changes in the automobile's windshield.

Initially, most front automobile windshields were generally rectangular in shape with the shorter edges being vertical and the longer edges being horizontal. To completely wipe a windshield, a blade system approximately the width or height of the windshield is the most efficient wiper, moving horizontally or vertically across the plane of the windshield. Vertical movement is more efficient than horizontal movement because of the shorter distance the blade must travel vertically to cover the entire windshield. With a flat windshield and parallel edges, a vertical wiper system is clearly superior in wiping efficiency.

As the automobile developed aerodynamic considerations as well as advances in glass manufacture caused the front automobile windshield to take on a generally trapezoidal shape with the windshield glass being bent around the central vertical axis of the trapezoidal shape. The result of this evolution is that a modern automobile's front windshield is not flat in a single plane not are the vertical sides parallel to each other. To compensate for these changes, the automobile industry compromised wiping efficiency. The automobile's front wiper system today is a double rotary wiper system. Although modern systems are generally adequate, they are much less efficient than vertical systems and leave "blind" spots.

SUMMARY OF THE INVENTION

Accordingly, it is a primary object of the invention to provide an automobile front windshield wiper system which vertically wipes the entire windshield.

It is a further object of the invention to provide a wiper unit which dynamically adjusts to the changing contours of the windshield.

It is another object of the invention to provide a wiper unit which dynamically adjusts to the changing width of the windshield.

It is still a further object of the invention to provide a wiper unit which eliminates water sheeting effects on a windshield.

Other and further objects, as well as various advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter in which there is illustrated and described a preferred embodiment of the invention.

DETAILED DESCRIPTION OF THE INVENTION

Figure 1:
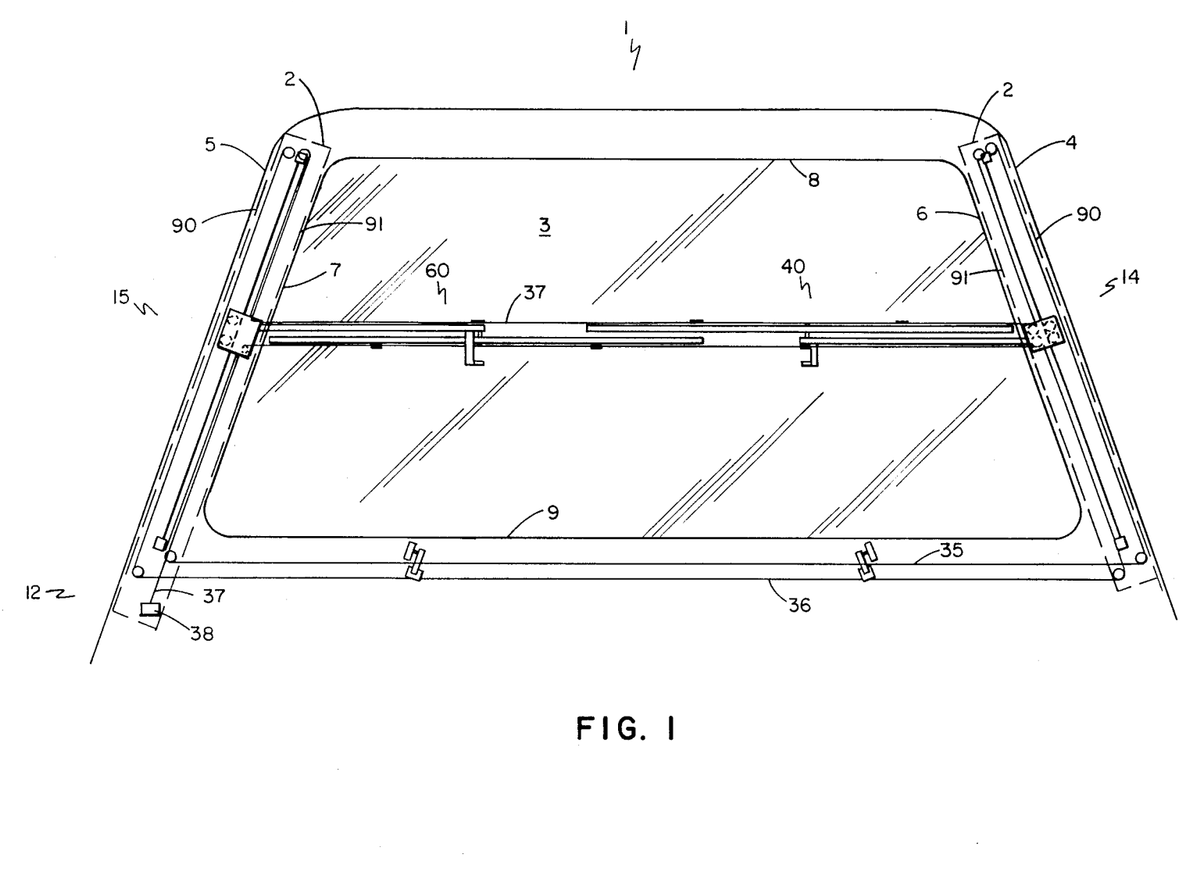
FIG. 1 is a front elevational view of an automobile windshield assembly depicting the invention applied thereto.
Figure 2:
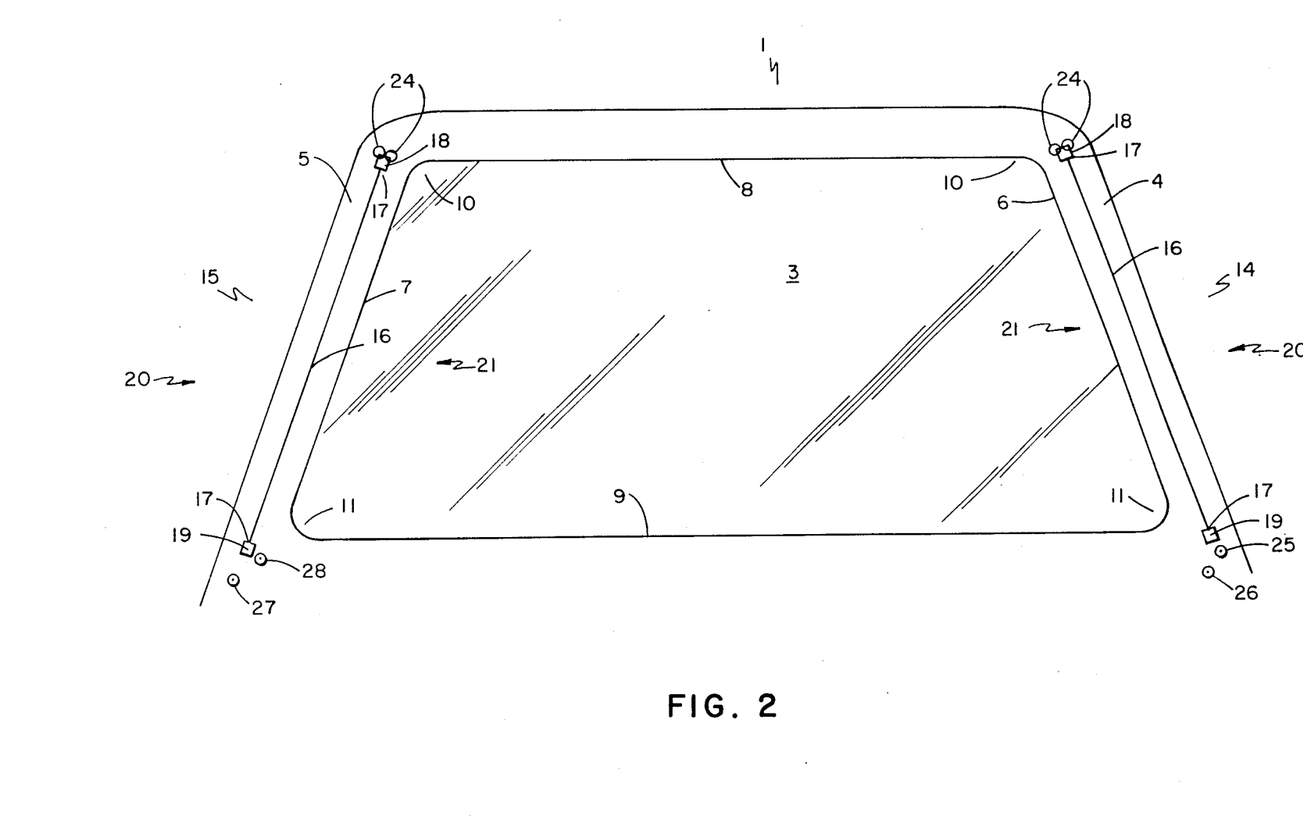
FIG. 2 is a front elevational view of an automobile windshield assembly depicting runner tracks applied thereto.

Referring to the drawings in detail wherein like numerals indicate like elements, reference numeral 1 refers to a generally trapezoidal-shaped front automobile windshield assembly with contoured glass 3. The assembly 1 has a left support pillar 4 and a right support pillar 5 positioned vertically on either side of the windshield assembly 1. The windshield assembly 1 has four edges: left vertical 6, right vertical 7, upper horizontal 8 and lower horizontal 9. The two vertical edges 6 and 7 are approximately equal in length, but are not parallel to each other. The lower horizontal edge 9 is longer than the upper horizontal edge 8, but both are parallel to each other. Along side each vertical edge 6 and 7, over each pillar 4 and 5 are a left runner track 14 and a right runner track 15, each comprised of a wire rod 16 connected at each end 17 to an upper bracket 18 and a lower bracket 19, said brackets 18 and 19 being bolted to the left and right pillars 4 and 5, respectively, proximate to each of the two upper corners 10 and lower corners 11 of the windshield assembly 1.

Figure 3:
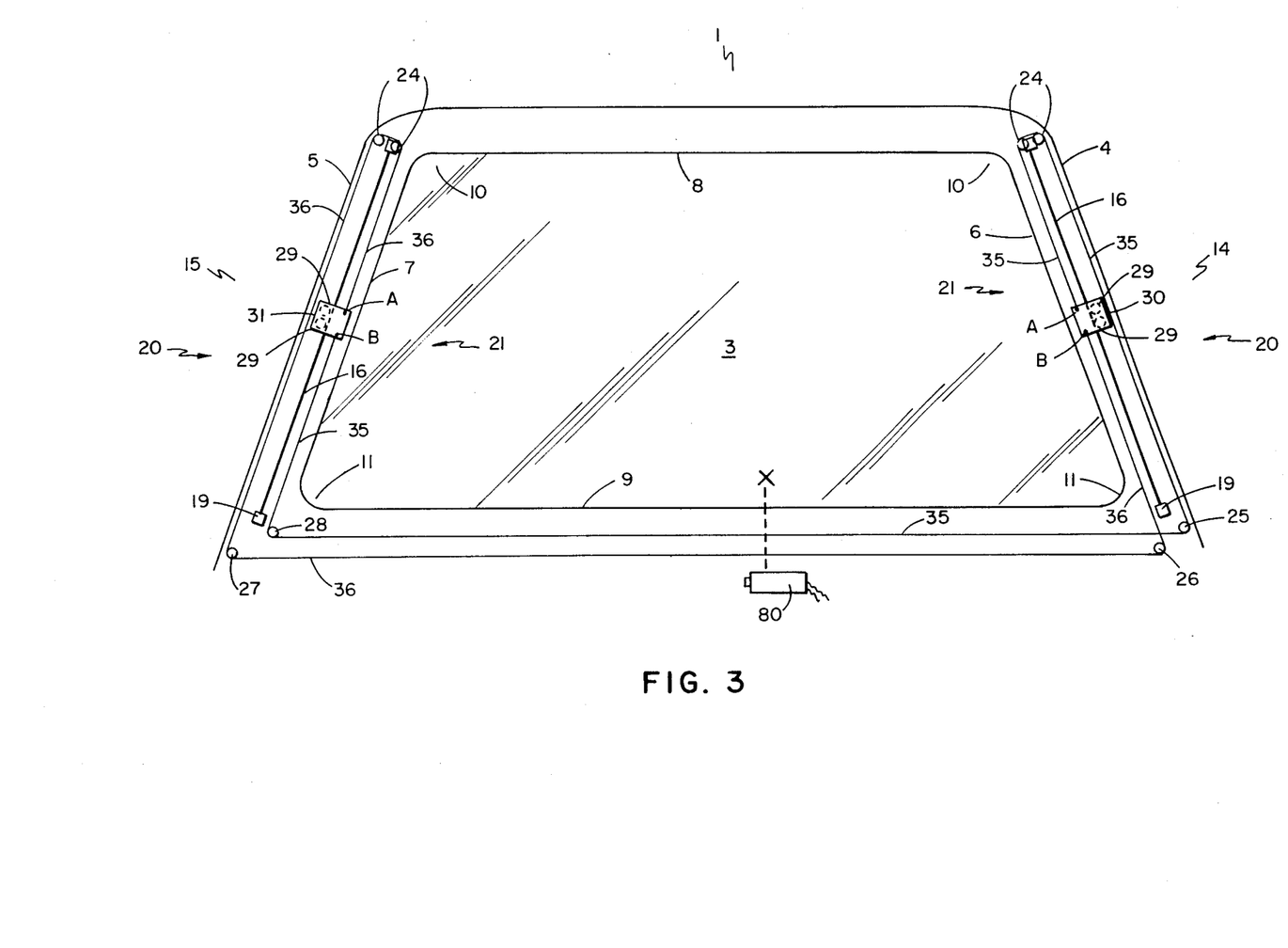
FIG. 3 depicts runner assemblies and driving cables added to the view of FIG. 2.

Two pairs of roller wheels 24 are attached to the upper brackets 18, one pair to each bracket 18. Two additional roller wheels 25 and 26 are attached to the left pillar 4 below the left lower bracket 19, one wheel 25 being positioned to the outside 20 of the longitudinal axis of the left runner track 14, and the other wheel 26 being positioned to the inside 21 of the longitudinal axis of the left runner track 14 vertically below the lower left outside roller wheel 25. Two other roller wheels 27 and 28 are attached to the right pillar 5 below the right lower bracket 19, one wheel 27 being positioned to the outside 20 of the longitudinal axis of the right runner track 15 and the other wheel 28 being positioned to the inside 21 of the longitudinal axis of the right runner track 15 vertically above the lower right outside roller wheel 27.

A left runner assembly 30 and a right runner assembly 31 rollably engage the wire rods 16 on the left and right runner tracks 14 and 15, respectively. Each runner assembly 30 and 31 has two roller wheels 29 contained therein which laterally engage the outside 20 of each wire rod 16. The roller wheels 24, 25, 26, 27, 28 and 29 are either in or are generally parallel along the radial axis to the plane of the windshield assembly 1.

A first driving cable 35 is attached to pount A on the upper section of the left runner assembly 30. The first said cable 35 is brought up along the inside 21 of the wire rod 16 of the left runner track 14 to the left inside upper roller wheel 24. The cable 35 engages the outsides of the inside and outside upper roller wheels 24 and is brought down along the outside 20 of the wire rod 16 past the left runner assembly's two roller wheels 29. The cable 35 then rotatably engages the outside of the lower left outside roller wheel 25 extending through point X to the lower right inside roller wheel 28. The cable 35 rotatably engages the outside of the lower right inside roller wheel 28 and is brought up along the inside 21 of the wire rod 16 of the right runner track 15 to a point B on the lower section of the right runner assembly 31 where the first cable 35 is terminally attached. A second driving cable 36 is attached to point A on the upper section of the right runner assembly 31. The second cable 36 is brought up along the inside 21 of the wire rod 16 of the right runner track 15 to the right inside upper roller wheel 24. The cable 36 rotatably engages the outsides of the inside and outside roller wheels 24 and is brought down along the outside 20 of the wire rod 16 past the right runner assembly's two roller wheels 29. The cable 36 then rotatably engages the outside of the lower right outside roller wheel 27 extending through point X to the lower left inside roller wheel 26. The cable 36 rotatably engages the outside of the lower left inside roller wheel 26 and is brought up along the inside 21 of the wire rod 16 of the left runner track 14 to a point B on the lower section of the left runner assembly 30 where the second cable 36 is terminally attached. Although the preferred embodiment uses two driving cables 35 and 36 for improved control and synchronous operation, the invention could be configured with one driving cable.

At point X a motor 80 would be connected to either the first cable 35 or the second cable 36. The motor 80 would drive either cable 35 or 36 back and forth an amount approximately equal to the vertical height of the glass 3. The cable 35, 36 and roller wheel 24-29 arrangement will cause the left runner assembly 30 and right runner assembly 31 to move vertically up and down in a synchronous and parallel motion along the wire rods 16 of the left and right runner tracks 14 and 15.

Figure 4:
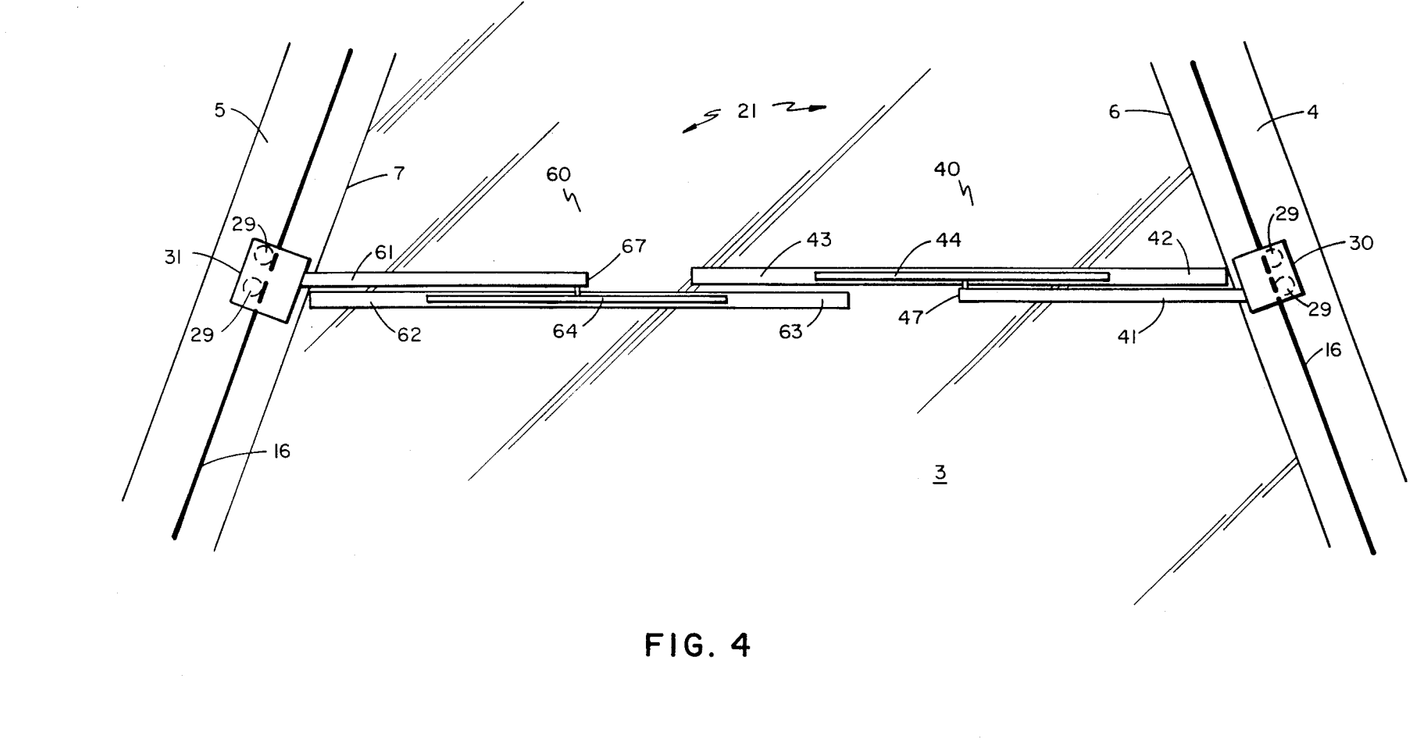
FIG. 4 is a front elevational view of the wiper assemblies of the present invention without a tension cable system.

Attached to each runner assembly 30 and 31 are left and right wiper assemblies 40 and 60. The left wiper assembly 40 is connected to the left runner assembly 30 and the right wiper assembly 60 is connected to the right runner assembly 31. Each wiper assembly 40, 60 is attached to its respective runner assembly 30, 31 by a wiper arm, left 41 and right 61. The wiper assemblies 40, 60 are each comprised of a first wiper blade assembly 42 and 62, respectively, and a second wiper assembly 43 and 63, respectively. The first and second wiper blade assemblies 42, 43 and 62, 63 for each wiper assembly 40, 60 are connected to each other by means of a flat interconnecting member 44 and 64, respectively, so that each set of wiper blade assemblies, i.e., 42, 43 and 62, 63, form horizontal wiping lines. The middle of each interconnecting member 44 and 64 is bolted to each respective wiper assembly wiper arm 41 and 61 near to the wiper arm's innermost end 47 and 67, respectively. The wiper blade assemblies 42, 43, 62, 63 in this embodiment are conventional off the shelf automotive wiper blade assemblies. The interconnecting members 44 and 64 are metallic and resilient.

The left wiper arm 41 extends to the middle of the interconnecting member 44 and is positioned parallel to and vertically below the first and second left wiper blade assemblies 42 and 43. The right wiper arm 61 extends to the middle of the interconnecting member 64 and is positioned parallel to and vertically above the first and second wiper blade assemblies 62 and 63. The left wiper arm 41 is aligned with the right wiper assembly 60 horizontal wiping line 62, 63. The right wiper arm 61 is aligned with the left wiper assembly 40 horizontal wiping line 42, 43. As the runner assemblies 30 and 31 move up and down along their respective runner tracks 14 and 15, the windshield glass 3 is wiped on both the vertical upward stroke and the vertical downward stroke. As the wiper assemblies 40 and 60 move vertically up and down the glass 3, the horizontal wiping lines 42, 43 and 62, 63 dynamically adjust to the width and contour of the glass 3. The second wiper blade assemblies 43 and 63 of each wiper assembly 40 and 60 overlap but do not touch. Because the vertical edges 6 and 7 of the windshield assembly 1 cant inward as they vertically rise, the wiper assemblies 40 and 60 will move toward each other. However, there is enough space between the left wiper second wiper blade assembly 43 and the right wiper arm 61, and vice versa, to accomodate this movement without interference. At the broadest portion of the glass 3 near the lower horizontal edge 9 the second wiper blade assemblies 43 and 63 have been designed to overlap. Consequently, the horizontal wiping lines completely cover the width of the glass 3 regardless of where the wiping line is on the trapezoidal shape.

Figure 5:
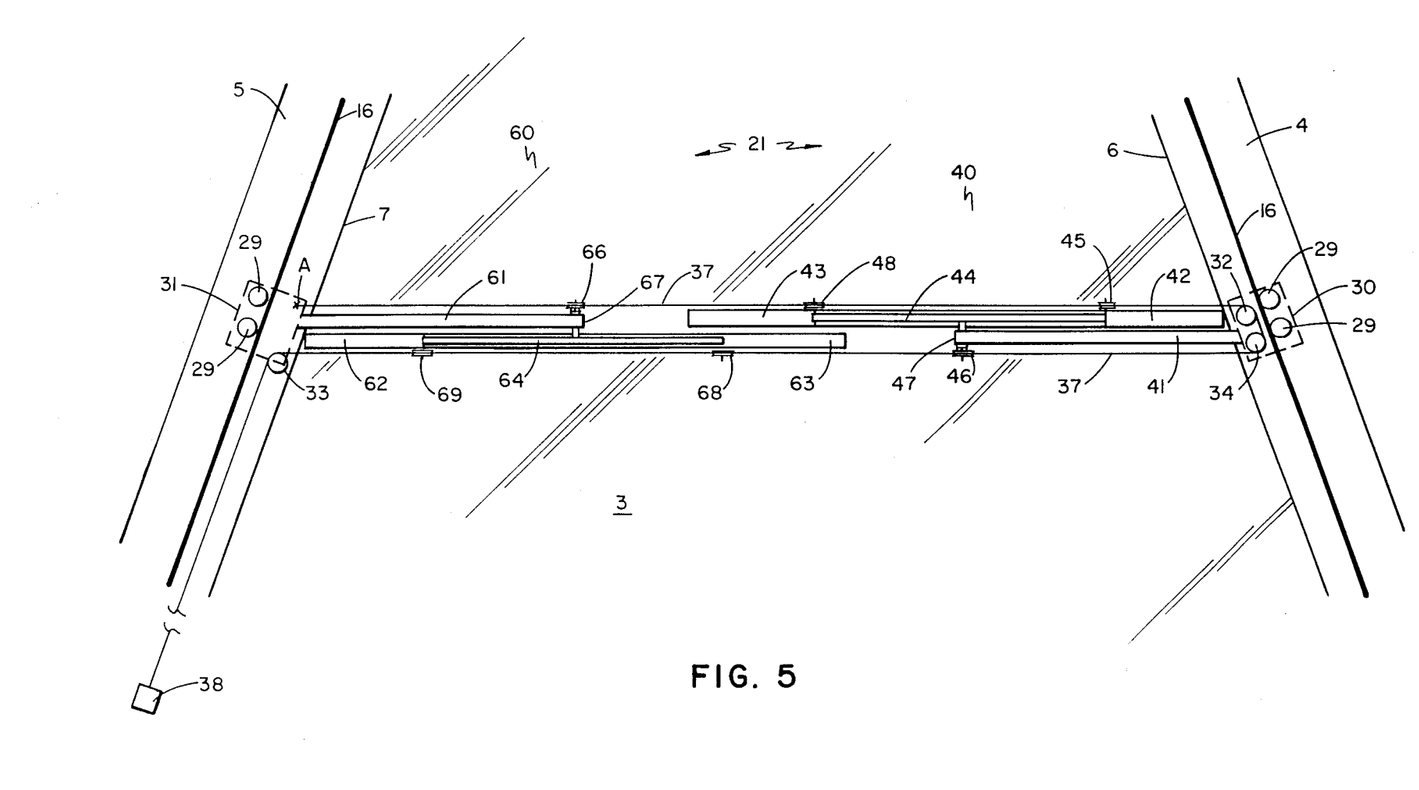
FIG. 5 is a front elevational view of the wiper assemblies of FIG. 4 with a tension cable system applied.
Figure 6:
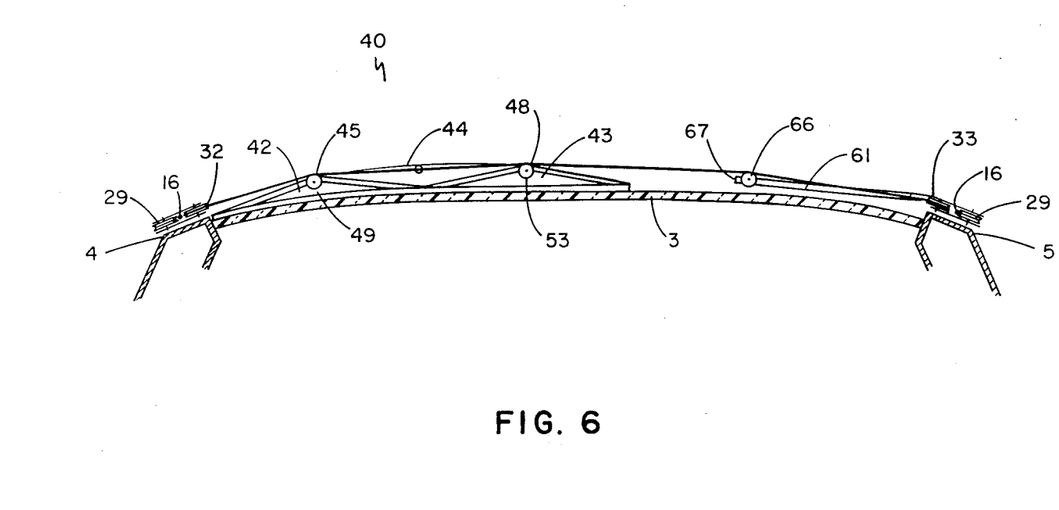
FIG. 6 is a top plan view of the wiper assemblies of FIG. 5.

The left runner assembly 30 has a third and fourth roller wheel 32 and 34 respectively contained therein positioned to the inside 21 of the wire rod 16 but not touching said rod 16. These wheels 32, 34 are in the same plane as the other roller wheels 29 contained within the left runner assembly 30. The left wiper arm 41 has one roller wheel 46 attached vertically below and to its innermost end 47 in a radial plane horizontal and perpendicular to the plane of the glass 3. Another roller wheel 45 is attached vertically atop the first wiper blade assembly's midpoint 49. Another roller wheel 48 is attached vertically atop the midpoint 53 of the second wiper blade assembly 43. The wheel 48 is in the same plane as the roller wheel 45.

The right runner assembly 31 also has a third roller wheel 33 contained therein and positioned to the inside of the wire rod 16 but not touching said rod 16. This wheel 33 is in the same plane as the other roller wheels 29 contained within the right runner assembly 31 and is located slightly below the horizontal midpoint of the lower of the two other roller wheels 29. The right wiper arm 61 has a roller wheel 66 at its innermost end 67 in a radial plane horizontal and perpendicular to the plane of the glass 3. The roller wheel 66 is attached vertically atop the wiper arm end 67. A second roller wheel 69 is located in a plane parallel with the first roller wheel 66 on the lower side of the midpoint of the first wiper blade assembly 62. Another roller wheel 68 is attached vertically below and to the midpoint of the second wiper blade assembly 63. This wheel 68 is in the same approximate plane as roller wheels 69 and 46.

To hold the wiper assemblies 40 and 60 against the contoured glass 3 during the wiping strokes, a tension is applied to the wiper assemblies 40 and 60 holding them against the glass 3. This is done by means of a third cable 37. The third cable 37 is attached to point A on the inside section of the right runner assembly 31. The cable 37 is brought horizontally and rotatably across the roller wheel 66 located at the end 67 of the right wiper arm 61. The cable 37 is extended horizontally across the roller wheels 48 and 45 of the left wiper assembly 40 and looped about the roller wheel 32 contained within the left runner assembly 30. The cable 37 is then looped about roller wheel 34 and returned horizontally back across the roller wheel 46 attached vertically below the left wiper arm end 47, across the roller wheels 68 and 69 of the right wiper assembly 60. The cable 37 is then looped about the third roller wheel 33 of the right runner assembly 31 and brought downward near to the inside 21 of the wire rod 16 of the right runner track 15 to a spring tension unit 38 located at the base 12 of the right pillar 5.

The tension cable 37 holds the wiper assemblies 40 and 60 against the glass 3 during their up and down wiping strokes. The use of separate wiper assemblies 40 and 60 and double blade assemblies therein provides flexibility in matching the changing contours of the glass 3. The resilient tension cable 37 provides flexible pressure on the wiper assemblies 40 and 60 holding them flush against the glass 3 during the wiping strokes.

Figure 7:
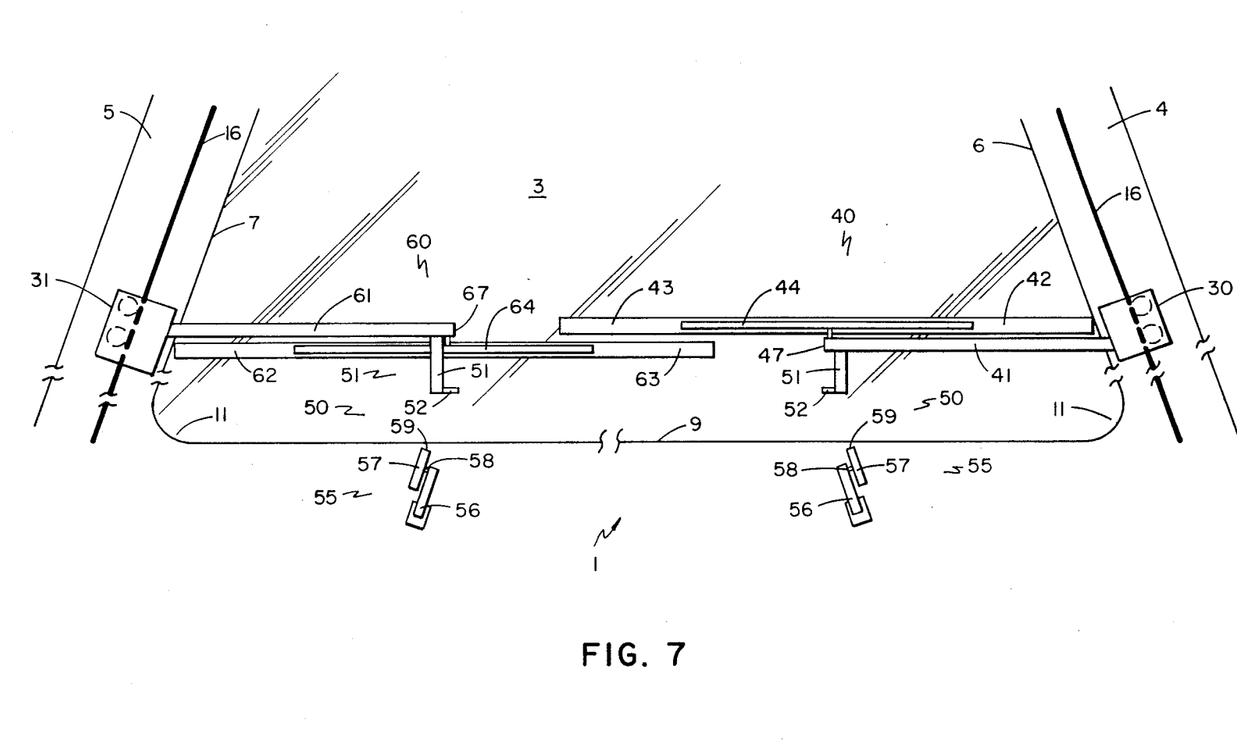
FIG. 7 is a front elevational view of the lifter units applied to the wiper assemblies.
Figure 8:
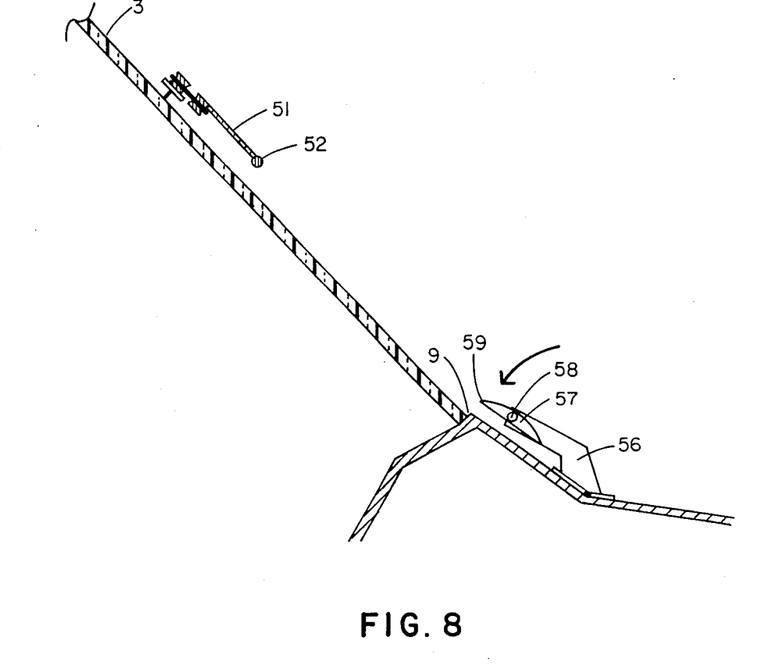
FIG. 8 is a side elevational view of one lifter unit.

As moisture is pushed upward by the wiper assemblies 40 and 60, the moisture tends to release into the ambient air flowing over the front and top of the automobile. As moisture is pushed downward by the wiper assemblies 40 and 60, surface tension must be broken at the end of the downward stroke, otherwise sheets of moisture will be drawn back by the wiper assemblies 40 and 60 during the upward stroke. To eliminate this problem lifter units 50 comprised of a lifter arm 51 and corresponding lifter ramp 55 are installed. Near to each wiper arm inside end 47 and 67 downwardly projecting lifter arms 51 are attached. Each lifter arm 51 terminates in a horizontally and inwardly extending member 52. Corresponding lifter ramps 55 are installed near to the lower horizontal edge 9 of the windshield assembly 1. The ramps 55 have a base 56, a spring loaded, curved, tiltable member 57 attached thereto. The member 57 is attached to the side of the base 56 by a small rod 58 about which the member 57 tilts. The spring action of the ramp 55 holds the member's upward end 59 down toward the glass 3. As the wiper assemblies 40 and 60 near the end of their downward wiping stroke, the horizontal lifter arm members 52 engage the ramp's curved members 57 causing the lifter arms 51 to slide upward over the ramp member 57. This lifts the wiper assemblies 40 and 60 and breaks the surface tension of the moisture on the glass 3. As the arm members 52 slide over the curved ramp members 57 the ramp members 57 will tilt backward causing the arm members 52 to slide down toward the glass 3. The spring action of the ramps 55 will cause the curved members 57 to snap back to their original positions thereby allowing the arm members 52 to slide back under the curved members 57 during the wiper assemblies' upward wiping strokes.

In the preferred embodiment a planar windscreen 2 is positioned over each runner track 14 and 15 and runner assembly 30 and 31. The longitudinal edge 90 of the windscreen 2 furthest away from the glass 3 is attached to the appropriate pillar 4 or 5 and the other longitudinal edge 91 is raised so that the wiper assemblies 40 and 60 may move freely without interference from the windscreens 2.

Figure 9:
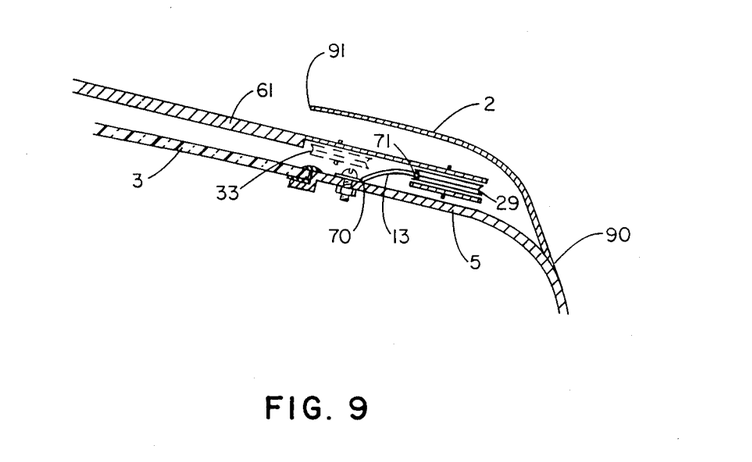
FIG. 9 is a top sectional view of an alternative embodiment of the wire rod in the runner tracks.

An alternative to each of the wire rods 16 within the runner tracks 14 and 15 is a thin, curved, planar longitudinal member 13 attached along its longitudinal edge 70 nearest to the glass 3 to the appropriate pillar 4 or 5 with its other longitudinal edge 71 raised from the pillar 4 or 5 away from the glass. As may be best understood from FIG. 9, the runner assemblies 30 and 31 are positioned similar to the wire rod 16 configuration except that the roller wheels 29 of each runner assembly 30 and 31 laterally engage the raised longitudinal edge 71 of the member 13.

It is understood that the above described embodiments are merely illustrative of the application, Other embodiments may be readily devised by those skilled in the art which will embody the principles of the invention and fall within the spirit and scope thereof.

I claim:

1. A windshield wiper system for vertically wiping the front windshield of an automobile, comprising:
    a left and right runner track, positioned and attached on either vertical side of said windshield, wherein each runner track is comprised of a wire rod connected at each end to an upper bracket and a lower bracket, said brackets being attached to automobile pillars on each side of said windshield, proximate to each upper corner and lower corner formed by said windshield:
    a runner assembly, slidably attached to each runner track;
    a horizontally positioned wiper assembly attached to each runner assembly by a wiper arm and extending on and past the midpoint of said wheelshield, wherein each wiper assembly has a first wiper blade assembly attached to its wiper arm such that the longitudinal axis of the assembly is in parallel to the longitudinal axis of the wiper arm, and a second wiper blade assembly connected to its first wiper blade assembly by means of a flat interconnecting member so that each wiper assembly's first and second wiper blade assemblies form a continuous wiping line, and wherein the longitudinal axis of one wiper assembly's horizontal wiping line is aligned with the longitudinal axis of the other wiper assembly's wiper arm;
    a plurality of driving cables interconnecting said runner assemblies for synchronously moving said runner assemblies vertically up and down said runner tracks;
    a tensioning cable tied across said wiper assemblies thereby holding them against said windshield; and
    a lifter unit for raising each wiper assembly at the end of its downward stroke, wherein each lifter unit is comprised of a downwardly pointing vertical lifter arm attached to each wiper arm and having a horizontal member attached to the end of the arm opposite to that end attached to the wiper arm, and a lifter ramp aligned and corresponding to each lifter arm member and attached at the lower edge of the windshield, wherein each lifter ramp engages, lifts and then releases each said lifter arm at the end of the downward wiping stroke.

2. A windshield wiper system for vertically wiping the front windshield of an automobile comprising:
    a left and right runner track, positioned and attached on either vertical side of said windshield, wherein each runner track is comprised of a thin, curved, planar longitudinal member attached along its longitudinal edge nearest to the windshield glass to respective automobile pillars on each side of said windshield and with its other longitudinal edge raised from the pillar away from the glass;
    a runner assembly, slidably attached to each runner track;
    a horizontally positioned wiper assembly attached to each runner assembly by a wiper arm and extending on and past the midpoint of said windshield, wherein each wiper assembly has a first wiper blade assembly attached to its wiper arm such that the longitudinal axis of the blade assembly is in parallel to the longitudinal axis of the wiper arm, and a second wiper blade assembly connected to its first wiper blade assembly by means of a flat interconnecting member so that each wiper assembly's first and second wiper blade assemblies form a continuous wiping line, and wherein the longitudinal axis of one wiper assembly's horizontal wiping line is aligned with the longitudinal axis of the other wiper assembly's wiper arm;

a plurality of driving cables interconnecting said runner assemblies for synchronously moving said runner assemblies vertically up and down said runner tracks;

a tensioning cable tied across said wiper assemblies thereby holding them against said windshield; and a lifter unit for raising each wiper assembly at the end of its downward stroke, wherein each lifter unit is comprised of a downwardly pointing vertical lifter arm attached to each wiper arm and having a horizontal member attached to the end of the arm opposite to that end attached to the wiper arm, and a lifter ramp aligned and corresponding to each lifter arm member and attached to the lower edge of the windshield, wherein each lifter ramp engages, lifts and then releases each said lifter arm at the end of the downward wiping stroke.

* * * * *